Figure 1:
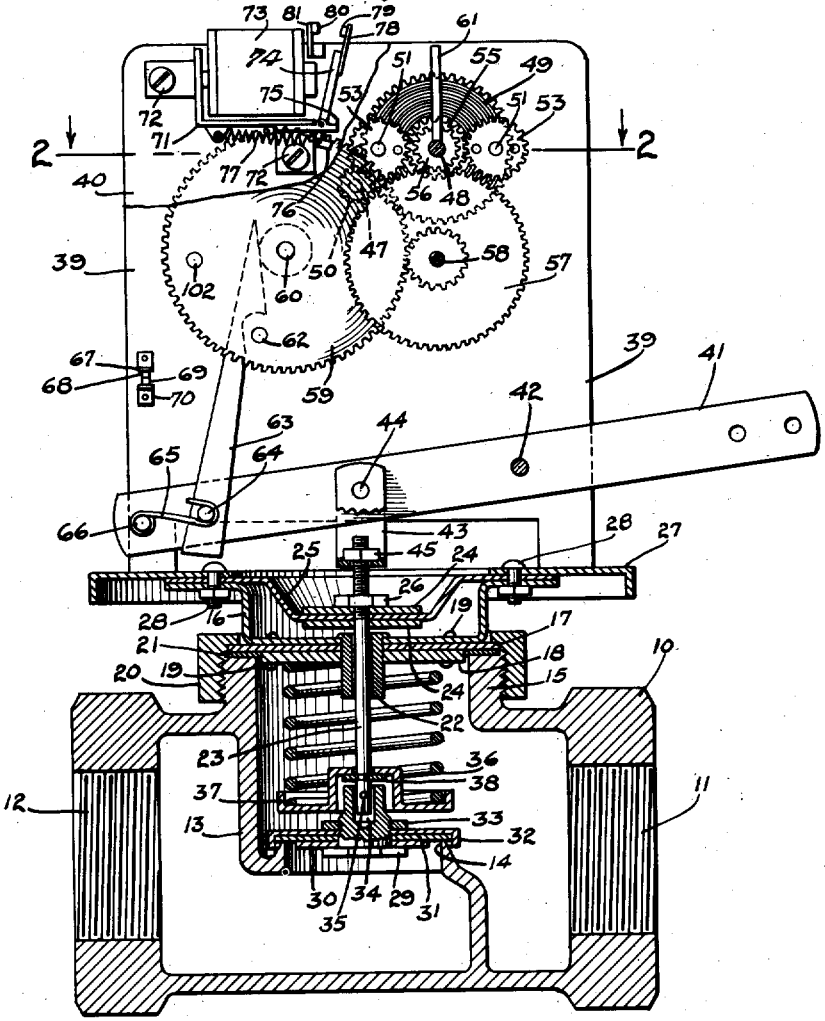

Nov. 5, 1935.  W. H. GILLE ET AL  2,019,671

GEARED CONTROL MECHANISM

Filed July 29, 1932  2 Sheets—Sheet 1

INVENTORS
WILLIS H. GILLE
GEORGE D. BOWER

By Paul, Paul & Moore,
ATTORNEYS

Nov. 5, 1935.  W. H. GILLE ET AL  2,019,671

GEARED CONTROL MECHANISM

Filed July 29, 1932   2 Sheets-Sheet 2

INVENTORS
WILLIS H. GILLE
GEORGE D. BOWER
By Paul, Paul & Moore
ATTORNEYS

Patented Nov. 5, 1935

2,019,671

UNITED STATES PATENT OFFICE 2,019,671

GEARED CONTROL MECHANISM

Willis H. Gille, St. Paul, and George D. Bower, Columbia Heights, Minn., assignors to Minneapolis-Honeywell Regulator Company, Minneapolis, Minn., a corporation of Delaware Application July 29, 1932, Serial No. 625,580

15 Claims. (Cl. 137—139)

The present invention relates to control mechanisms which are normally biased to one position and are moved in at least one direction by actuators which are connected thereto through suitable gear reductions.

The primary object of the invention is the utilization of a gear reduction of the type in which the actuator is operatively connected to the control mechanism when one of the gears of the gear reduction is held stationary or prevented from rotating and is operatively disconnected therefrom when the gear is allowed to move or rotate.

Specifically the invention provides for the operation of a control mechanism that is biased to one position, by an electric motor through the medium of a planetary gearing arrangement which couples the motor to the control mechanism when one of the gears of the planetary gearing arrangement is held against rotation. Whenever this gear is freed for rotation the control mechanism moves to its biased position under the influence of its bias without rotating the whole planetary gearing arrangement and electric motor in the reverse direction. This is accomplished simply by preventing or allowing rotation of one of the gears as the case may be and does not require the meshing or unmeshing of the gears in any manner whatsoever.

Such a mechanism readily lends itself to the control of a gas valve which is normally biased to closed position, and which it is desired to open slowly and close quickly. A further object of the invention, therefore, is the provision of actuating mechanism for a gas valve normally biased to closed position which actuating mechanism includes a planetary gearing arrangement arranged in such a manner that when one of the gears of the planetary gearing arrangement is prevented from rotating the gas valve is slowly opened by means of the full gear reduction of the planetary gearing arrangement and when said gear is released the valve quickly closes under its bias without rotating the whole planetary gear arrangement in reverse direction.

It will readily be appreciated that for electrical operation, the means for preventing rotation of one of the gears could well be electrically connected to the power source so that on a failure in the supply of the electricity the gear would be freed for rotation thus allowing the control mechanism to move to its biased position.

Further and more detailed objects of the invention will become apparent as the description thereof proceeds. For a more complete understanding of the invention reference may be had to the following description and accompanying drawings, in which, Fig. 1 is a view showing the invention applied to a gas valve, the valve being in section and the front gear plate being broken away, Fig. 2 is a sectional view on line 2—2 of Fig. 1 showing the gear drive.

Figure 3:
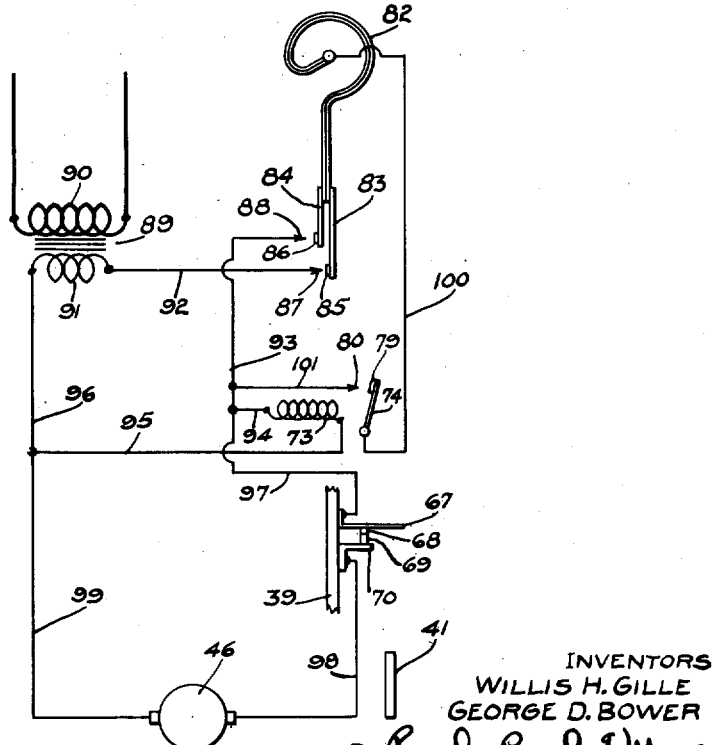

Fig. 3 is a schematic diagram showing one manner in which the valve may be controlled.

Figure 2:
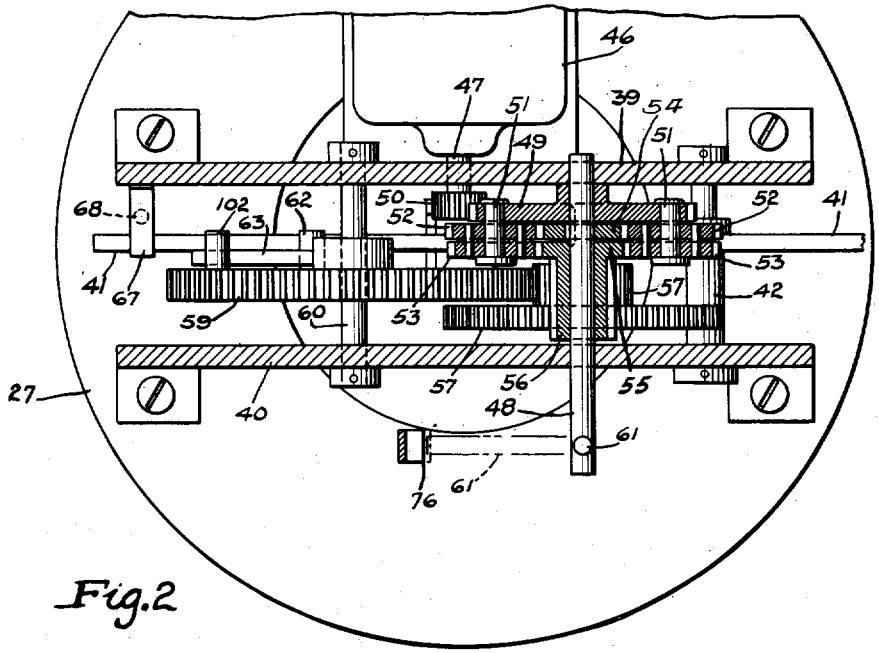

Referring to Figs. 1 and 2, the invention as herein illustrated comprises a valve casing 10 having inlet and outlet ports 11 and 12, and a partition 13 therebetween which is provided with a valve opening 14. The valve casing 10 is further provided with a vertically extending cylindrical portion 15 that is provided with screw threads on its outer surface. A cup-shaped member 16 has a large disc 17 and a smaller disc 18 secured to its under side by any suitable means such as the rivets 19. A bonnet 20 engages disc 17 and cooperates with the screw threads formed on extension 15 to clamp cup member 16 and discs 17 and 18 to valve casing 10. A sealing gasket 21 is preferably interposed between cylindrical extension 15 and disc 17 to prevent the escape of gas or other fluid flowing through the valve casing 10. A guide bushing 22 for a valve stem 23 passes through cup member 16 and discs 17 and 18 and is preferably secured to cup member 16 by having its end peened over. The upper portion of valve stem 23 is threaded and has a pair of diaphragm clamping discs 24 threaded thereon. A diaphragm 25 is clamped between discs 24 and a nut 26 threaded on valve stem 23 engages the upper diaphragm clamping disc 24 to help retain it in its proper position. Diaphragm 25 acts as a sealing-off diaphragm to prevent the escape of gas from valve casing 10 to the atmosphere and is clamped between a circular base plate 27 and cup member 16 by means of screws and nuts 28.

A screw 29 first receives a washer 30, then a valve disc 31 and a valve disc retainer 32 which are clamped on screw 29 by means of a nut 33. Screw 29 is provided with a bore 34 of somewhat larger diameter than the valve stem 23 and loosely receives the lower end of valve stem 23. Valve stem 23 is secured to screw 29 by a small pin 35 which passes through valve stem 23 and screw 29. A coil spring 36 has its upper end abutting disc 18 and its lower end abutting a spring retainer 37 which is slidably received on valve stem 23 and has its downward motion limited by a washer 38 that engages a circumferential groove formed in valve stem 23. In this manner valve disc 31 is constantly biased to close valve opening 14 by coil spring 36.

Base plate 27 has a pair of plates 39 and 40 secured thereto which support the various operating mechanisms for moving valve disc 31 away from valve opening 14 against the bias of coil spring 36. A lever 41 is pivoted on a shaft 42 which is journalled in plates 39 and 40. A U-shaped member 43 is loosely pivoted to lever 41 as indicated at 44 and loosely receives the upper end of valve rod 23 which is supplied with a nut 45 whereby clockwise rotation of lever 41 about its pivot causes valve disc 31 to be raised against the bias of coil spring 36. A motor 46 is secured to the plate 39 and its rotor shaft 47 extends through plate 39 and terminates between plates 39 and 40. A shaft 48 which is journalled in plates 39 and 40 has a gear 49 loosely mounted thereon which meshes with a pinion 50 secured to rotor shaft 47. Two stud shafts 51 are secured to gear 49 at diametrically spaced points near the periphery thereof. Each of these stud shafts 51 journals a pair of pinions 52 and 53 which are secured together. The pinions 53 are provided with a smaller number of teeth than the pinions 52, and in this particular embodiment of the invention the pinions 53 have one less tooth than the pinions 52. Pinions 52 mesh with a gear 54 and pinions 53 mesh with a gear 55 which is integral with a pinion 56 loosely mounted on shaft 48. Gear 54 is secured to shaft 48. Pinion 56 meshes with the gear of a gear and pinion assembly 57 mounted on a shaft 58 which is journalled in plates 39 and 40 and the pinion of gear and pinion assembly 57 meshes with a relatively large gear 59 which is mounted on a shaft 60 that is also journalled in plates 39 and 40. Shaft 48 extends in front of plate 40 and has a short rod 61 secured thereto at right angles with the axis of shaft 48. Gear 59 carries a pin 62 which upon rotation of gear 59 in a clockwise direction as viewed in Fig. 1 is adapted to engage the hooked end of a lever 63 which is pivoted to lever 41 as indicated at 64. Lever 63 is normally biased to engage the hub of gear 59 by means of a spring 65 which engages the left hand side of lever 63 and is then wrapped around pivot 64 and a pin 66 carried by lever 41.

A spring finger 67 is secured to plate 39 and extends over the end of lever 41. Spring finger 67 carries a contact 68 which cooperates with a contact 69 carried on the upper surface of a spring finger 70 which is also secured to plate 39, but does not extend over lever 41. By this arrangement when lever 41 has been rotated clockwise sufficiently to open the valve it engages spring finger 67 so as to separate contacts 68 and 69.

A bracket 71 is secured to plate 40 by any means such as screws 72 and supports an electro-magnetic coil 73 which has an armature 74 that is pivoted on a bearing plate 75 carried by bracket 71. Armature 74 is provided with a lateral extension 76 and is normally biased to the position shown by a coiled spring 77. When the armature 74 is in the position shown in Fig. 1, the lateral extension 76 is out of the path of the end of rod 61, but when magnet coil 73 is energized so as to attract armature 74 extension 76 is placed in the path of the rod 61. Armature 74 carries a spring finger 78 having a contact 79 which engages a contact 80 carried by a spring finger 81 secured to plate 40 when armature 74 is attracted by a magnet coil 73.

Operation

Fig. 3 of the drawings shows one manner in which the valve of Figs. 1 and 2 may be controlled. In this particular type of control a thermostat of the holding type has been illustrated and comprises a bimetallic element 82 fixed at one end. The free end of the bimetallic element 82 carries spring fingers 83 and 84 which support contacts 85 and 86 that are sequentially engageable with contacts 87 and 88 on temperature fall. The source of power is herein shown as a step-down transformer generally indicated at 89 which comprises a high voltage primary 90 and a low voltage secondary 91.

When contact 85 engages contact 87 and then contact 86 engages contact 88 on temperature fall an energizing circuit for magnet coil 73 is established as follows: secondary 91, wire 92, contacts 87, 85, fingers 83, 84, contacts 86, 88, wires 93, 94, magnet coil 73, and wires 95 and 96 to secondary 91. An energizing circuit for motor 46 is also established as follows: Secondary 91, 92, 87, 85, 83, 84, 86, 88, 93, wire 97, finger 67, contacts 68, 69, finger 70, wire 98, motor 46, wire 99, and 96 to secondary 91. Energization of magnet coil 73 attracts armature 74 to close contacts 79 and 80 to establish a holding circuit for magnet coil 73 as follows: secondary 91, 92, 87, 85, 83, bimetallic element 82, wire 100, armature 74, contacts 79, 80, wire 101, 93, 94 magnet coil 73, 95, and 96 to 91. A similar holding circuit is also established for motor 46.

The motor 46 being energized rotates pinion 50 in a counter-clockwise direction as viewed in Fig. 1. Pinion 50 in turn rotates gear 49 in a clockwise direction. Because of the friction between pinion 56, gear and pinion assembly 57 and gear 59 it can be considered that gear 55 remains relatively stationary. Pinions 53, therefore, rotate around gear 55 in a clockwise direction and also turn about stud shafts 51 in a clockwise direction. Pinions 52 which are secured to pinions 53 therefore drive gear 54 in a counter-clockwise direction until rod 61 engages extension 76 of armature 74, it being remembered that extension 76 was moved into the path of rod 61 upon energization of magnet coil 73. When rod 61 engages extension 76 gear 54 is held stationary. Pinions 52 now rotate around gear 54 in a clockwise direction and rotate about the stud shafts 51 in a clockwise direction thereby driving pinions 53 in the same direction which in turn rotate gear 55 and pinion 56 in a clockwise direction. Gear 55 and pinion 56 are rotated clockwise at a very slow rate of speed because pinions 53 have one less tooth than pinions 52. Pinion 56 drives gear and pinion assembly 57 in a counter-clockwise direction which in turn rotates gear 59 clockwise. As gear 59 continues to rotate pin 62 will engage the hooked end portion of lever 63 to rotate lever 41 and open the valve against the bias of coil spring 36. When the valve reaches its full open position lever 41 engages finger 67 to separate contacts 68 and 69 thereby breaking the circuit to motor 46. The valve will be maintained in its open position by reason of engagement of the end of rod 61 with extension 76 of armature 74. Contacts 68 and 69 may be omitted if desired and the motor 46 stalled when the valve has been moved to full open position.

When the temperature of bimetallic element 82 rises sufficiently to disengage contact 86 from contact 88 and then contact 85 from contact 87, magnet coil 73 will be deenergized allowing armature 74 to move to the position shown in Fig. 1 wherein extension 76 moves out of the path of the end of rod 61. This frees shaft 48 and gear 54 for rotation. Coil spring 36 moves lever 41 to the position shown in Fig. 1 and lever 63 rotates gear 59 in counter-clockwise direction. This rotates gear and pinion assembly 57 in a clockwise direction which in turn drives gear and pinion 55 and 56 respectively in a counter-clockwise direction. Gear 55 rotates pinions 53 in a clockwise direction about stud shafts 51 and pinions 52 which are secured to pinions 53 drive gear 54 and shaft 48 in a counter-clockwise direction. Gear 49 stands still. This reverse rotation of the several gears and pinions takes place very quickly so that the valve closes substantially immediately upon deenergization of magnet coil 73. In order to prevent undue continued movement of pin 62 away from lever 63 gear 59 may be provided with a second pin 102 which engages the left hand of lever 63.

From the foregoing description it will be evident that this invention utilizes a planetary gearing arrangement in a novel manner so that a gas valve or other similar control mechanism which is normally biased to one position may be moved slowly to a second position against its bias by the expenditure of a proportionately small amount of energy and subsequently returned to its first position under its bias in a very short time. While a specific embodiment of the invention has been described in which planetary gearing has been utilized it is to be understood that any other suitable type of gearing which is operatively connected when one of the gears is prevented from rotating could be substituted therefor.

While the invention has been particularly described in connection with the valve or other control mechanism which is moved to one position rather slowly and is allowed to quickly move to its other position, it is to be understood that the invention is also well adapted for use as a so-called "power failure safety mechanism" wherein the valve or other control mechanism is normally moved to each of its positions by the power of the motor 46 and in which the magnet coil 73 is constantly energized to hold the gear 54. In this manner there would normally always be a driving connection between the motor and the control mechanism, but upon failure of electrical power magnet coil 73 would be deenergized so as to allow the control mechanism to move to a safe position since it cannot be automatically controlled until power is resumed.

While a specific embodiment of the invention has been herein described, it is to be understood that we are to be limited only in the purview of the appended claims.

We claim as our invention:

1. A device of the class described, comprising, an actuator, a gear train connected thereto, a control mechanism biased to one position and connected to the gear train for movement against its bias to another position by the actuator, said gear train including a gear which operatively connects the actuator to the control mechanism when the gear is prevented from rotating, and electrically controlled means for preventing rotation of said gear when energized, said gear train being non-reversible when said gear is held against rotation.

2. A device of the class described, comprising, an actuator, a gear train connected thereto, a control mechanism biased to one position and connected to the gear train for movement against its bias to another position by the actuator, said gear train including a gear which operatively connects the actuator to the control mechanism when the gear is prevented from rotating, said biasing means having sufficient strength to move the control mechanism to said one position only when said gear is permitted to rotate, and an electro-magnet for preventing rotation of said gear when energized, said gear train being non-reversible when said gear is held against rotation.

3. A device of the class described, comprising, in combination, an electrically operated actuator, a control mechanism biased to one position, a gear train connecting the actuator to the control mechanism, said gear train including a gear which when held against rotation operatively connects the actuator to the control mechanism, electrically controlled means for holding said gear against rotation when energized whereby the control mechanism may be moved against its bias to a second position by the actuator when energized, and means for deenergizing the actuator without deenergizing the holding means when the control mechanism has been moved to its second position, said gear train being non-reversible when said gear is held against rotation.

4. A device of the class described, comprising, in combination, an electrically operated actuator, a gear train connected thereto, a control mechanism operated by the gear train in one direction, said gear train including a gear which when held against rotation operatively connects the actuator to the control mechanism electrically operated means for holding said gear against rotation, biasing means of sufficient strength to operate the control mechanism in the opposite direction only when said gear is free to rotate, and means for simultaneously energizing and separately deenergizing said actuator and holding means, said gear train being non-reversible when said gear is held against rotation.

5. A slow opening and quick closing valve, comprising, a valve biased to closed position, an actuator, a gear train connecting the valve and actuator, said gear train including a gear which when held against rotation operatively connects the actuator to the valve whereby the valve is slowly opened against its bias, means for holding said gear against rotation, and means for operatively releasing the valve from the actuator to allow the same to return to closed position under the influence of its bias by releasing said holding means.

6. A slow opening and quick closing valve, comprising, a valve biased to closed position, an electric motor, a gear train connected between the motor and valve, said gear train including a gear which when held against rotation operatively connects the motor to the valve through the gear train whereby the valve may be slowly opened against its bias, electrically controlled means for holding said gear against rotation, said gear when released allowing the valve to move quickly to its biased closed position without rotating the whole gear train and motor in the reverse direction, and means for simultaneously energizing and separately deenergizing said motor and holding means.

7. A slow opening and quick closing valve, comprising, a valve biased to closed position, an electric motor, a gear train connected to the motor and valve, said gear train including a gear which when held against rotation operatively connects the motor to the valve through the gear train whereby the valve may be slowly opened against its bias, electrically operable means for holding said gear against rotation when energized, said valve biasing means having sufficient strength to close the valve only when said gear is free to rotate, and means for simultaneously energizing said motor and means, said gear train being non-reversible when said gear is held against rotation.

8. A slow opening and quick closing valve, comprising, a valve biased to closed position, an electric motor, a gear train connected to the motor and valve, said gear train including a gear which when held against rotation operatively connects the motor to the valve through the gear train whereby the valve may be slowly opened against its bias, an electromagnet for holding said gear against rotation when energized, and a switch operated by the valve when moved to its open position for deenergizing the motor, said valve bias being sufficient to quickly move the valve to closed position when said gear is released for rotation by said holding means upon deenergization of said electromagnet.

9. A device of the class described, comprising, in combination, a control mechanism normally biased to one position, a planetary gear train connected thereto, an electrically operated actuator for the planetary gear train, and electrically operated means for holding one of the gears of the planetary gear train stationary whereby the control mechanism is moved to a second position against its bias through the complete planetary gearing, and on release of said gear the control mechanism is moved to its biased position without revolving the complete planetary gearing in its reverse direction, and means for simultaneously energizing and separately deenergizing said actuator and holding means.

10. A device of the class described comprising in combination, a control mechanism biased to one position, an actuator for moving the control mechanism against its bias to a second position, a gear train between the control mechanism and the actuator including one gear which when held stationary operatively connects the control mechanism to the actuator and when released operatively disconnects the control mechanism from the actuator, means for operating said actuator and simultaneously holding said one gear to permit the actuator to slowly move the control mechanism to its second position, said means being operative to continue to hold said gear thereby to maintain said control mechanism in its second position and for subsequently releasing said holding means to permit the control mechanism to return quickly to its biased position, said gear train being non-reversible when said gear is held against rotation.

11. A device of the class described comprising in combination, a control mechanism biased to one position, an actuator for moving the control mechanism against its bias to a second position, a gear train between the control mechanism and the actuator including an element which when held stationary operatively connects the control mechanism to the actuator and when released operatively disconnects the control mechanism from the actuator, said biasing means having sufficient strength to move said control mechanism to said one position only when said element is released, an electromagnet which when energized holds said element to permit the actuator to slowly move the control mechanism to its second position and then to hold said control mechanism in its second position, means for rendering the actuator inactive as soon as the control mechanism reaches its second position, and means for thereafter deenergizing said electromagnet to permit the control mechanism to return quickly to its bias position, said gear train being non-reversible while said element is held stationary.

12. A device of the class described comprising in combination a control mechanism biased to one position, an electric motor for moving the control mechanism against its bias to a second position, a gear train between the control mechanism and the motor including one gear which when held stationary operatively connects the control mechanism to the motor and when released operatively disconnects the control mechanism from the motor, an electromagnet which when energized holds said one gear stationary, an electric circuit for the motor and electromagnet, means for simultaneously energizing the motor and electromagnet to cause the control mechanism to move to its second position and thereafter deenergizing the electromagnet to permit the control mechanism to return to its biased position, and a switch which is operated by the control mechanism and is closed when the control mechanism is in its biased position and is open when the control mechanism is in its second position and is connected in series with the motor.

13. A device of the class described, comprising, in combination, a control mechanism normally biased to a first position, a planetary gear train connected thereto, an actuator for the planetary gear train, and means for holding one of the gears of the planetary gear train stationary to provide a driving connection between the actuator and the control mechanism whereby the latter may be moved to a second position by the former and to prevent return of the control mechanism to its first position by the biasing means, said gear train being non-reversible when the said gear is held against rotation and said control mechanism returning quickly to its biased position without revolving the whole planetary gear train in reverse direction upon release of said holding means.

14. A device of the class described comprising in combination, a valve normally biased to one position, a planetary gear train connected thereto, an actuator for the gear train, means for holding one of the gears of the planetary gear train stationary whereby the valve may be moved to a second position under power transferred through said planetary gear train, and means for operating said holding means independently of said actuator whereby the valve may be held in its second position independently of the actuator, said valve returning quickly to its first position without revolving the whole planetary gear train in reverse direction upon release of said holding means.

15. A device of the class described comprising, a control element having first and second positions, an electric motor for moving said element to its second position, a gear train between the control element and the motor including one gear which when held stationary operatively connects the motor to the control element and when released operatively disconnects the motor from the control element, biasing means of sufficient strength to move the control element to its first position only when said one gear is released, electrical holding means which when energized hold said one gear stationary, an electric circuit for the motor and holding means, a main control switch in the circuit which when closed energizes both the motor and holding means whereupon the control element is slowly moved to its second position through the entire gear train, a normally closed switch which is opened when the control element reaches its second position thereby to deenergize the motor only, said control element remaining in its second position until the holding means is deenergized by the opening of the main control switch.

WILLIS H. GILLE.
GEORGE D. BOWER.